Jan. 14, 1936.  H. H. LAMPERT  2,028,073
PEDAL PAD
Filed June 5, 1935
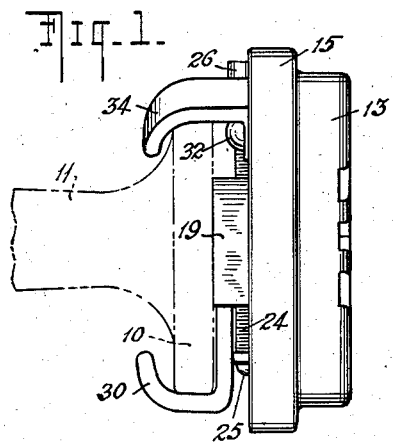
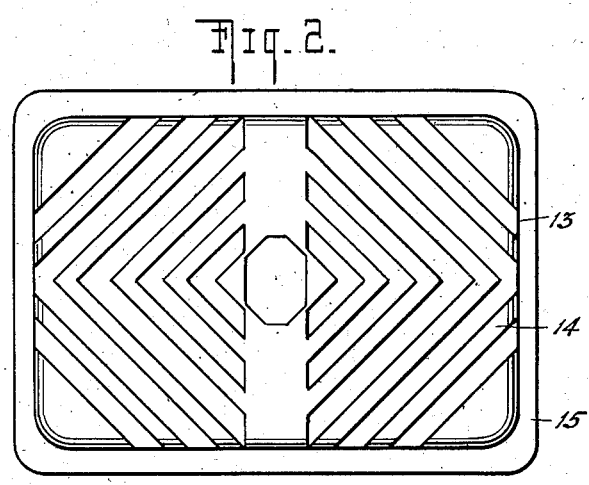
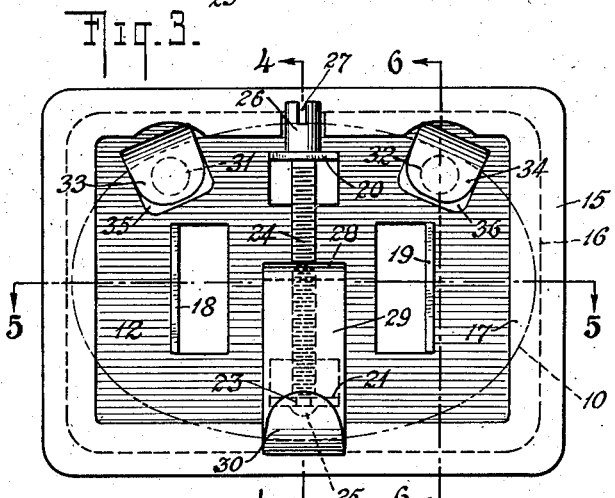
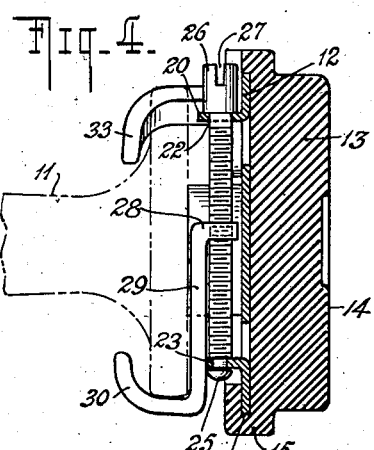
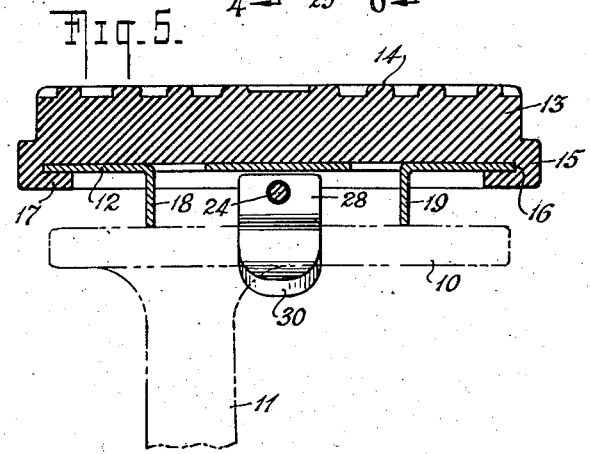
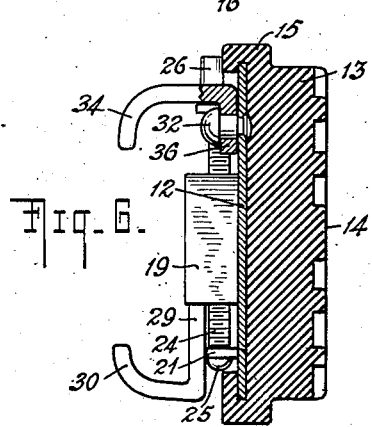
INVENTOR
HERBERT H. LAMPERT.
BY
ATTORNEY Patented Jan. 14, 1936

2,028,073

UNITED STATES PATENT OFFICE 2,028,073

PEDAL PAD

Herbert H. Lampert, Brooklyn, N. Y., assignor to Kastar Specialty Mfg. Co., Inc., New York, N. Y., a corporation of New York Application June 5, 1935, Serial No. 24,998

7 Claims. (Cl. 74—563)

My invention relates to a foot pedal attachment familiarly known as a pedal pad and more particularly to a pedal pad of the "Universal" type, capable of application to foot pedals of any size, configuration, or construction. While my novel adjustable pedal pad may be applied to a pedal tread of any apparatus having a foot pedal, its most extensive use is indicated in an automotive vehicle and more particularly in connection with the clutch and brake pedal devices thereof.

My invention contemplates the provision of a foot pedal attachment or pad, having a resilient face, for instance, of rubber, the device being constructed so that it may be applied to a pedal tread of any size or configuration by means of a single tool operative to clamp the pedal on the pedal tread. While so-called "Universal" pedal pads are now available on the market, their construction is complicated and they are not easily applied to a clutch or brake pedal. My novel pedal pad is characterized by certain advantages in both construction and application not present in the devices of the prior art.

An object of my invention is to provide a foot pedal pad of simple construction, comparatively low cost of manufacture, and capable of easy attachment, necessitating but a single adjustment in order to secure the same to the pedal tread by the engagement of the tread by the clamping elements of the structure. Another object of the invention is to provide a pedal pad construction in which the resilient pad portion of the device is removable from the supporting metal structure and is therefore replaceable. This method of assembly of the device also has the great advantage in manufacture of making possible the separate moulding of the resilient portion of the pad, instead of moulding the rubber portion directly onto the metal support, as has been necessary with the devices of the prior art, with the attendant greater expense. The separately formed resilient pad also makes possible its replacement when worn, in the course of its use, by a new pad.

A further object of the invention is to provide a pedal pad of the "Universal" type in which two of the clamping jaws, adapted to engage one side of the pedal tread to which the pad is to be applied, are pivotally mounted upon the supporting frame so that they may conform freely to the shape and contour of such tread and thereby yield a more certain clamping engagement with said tread, the third jaw, adapted to engage the opposite side of the tread, being movable toward the pivoted jaws by a single adjusting operation.

Other and more specific objects of the invention will be apparent from the description of the specific embodiment thereof illustrated in the accompanying drawing.

In such drawing, Fig. 1 is a side view of my novel pedal pad in its position of attachment to the foot pedal tread; Fig. 2 is a plan view of the resilient face portion of the pedal pad; Fig. 3 is a bottom plan view of the pedal pad showing in outline a pedal tread of oval configuration to which the pad is attached; Fig. 4 is a section on the line 4—4 of Fig. 3; Fig. 5 is a section on the line 5—5 of Fig. 3; and Fig. 6 is a section on the line 6—6 of Fig. 3.

Referring more particularly to the drawing, in which similar reference characters identify similar parts in the several views, 10 is the tread provided at the end of the stem 11 of a clutch or brake mechanism, for instance, of an automotive vehicle to which my novel pedal pad is adapted to be attached. The tread 10 may be either of rectangular or oval configuration, my attachment being equally adaptable to either of these two types of foot pedal treads.

My novel foot pedal pad comprises a support 12 to which is adapted to be removably attached a cushioning pad 13 of a resilient material, for instance, rubber. The cushioning pad 13 is preferably made of rectangular configuration having a tread portion or facing 14 which may be formed of any desired design for obtaining an irregular surface for greater frictional contact therewith of a shoe resting thereon. The cushioning pad includes a body of resilient material 15 having an interior peripheral channel 16 of a width to accommodate the peripheral edges of the metallic support 12. The cushioning pad 13 is secured to the metallic support 12 by forcing the peripheral edges of such support into the interior peripheral channel 16 of the pad so that the flange portions 17 of the cushioning pad overlie the peripheral edges of the support as shown clearly in Fig. 5. The cushioning pad 13 is thus capable of removal from the support 12 for the purpose of replacement on such support of a new cushioning pad after the original pad has become worn.

The support 12 of my novel foot pedal pad structure comprises a sheet of pressed steel or other suitable material of a size and configuration sufficient to substantially cover the usual tread of a clutch or brake. Out of such sheet of metal are cut portions 18 and 19 which are then bent from the surface of the sheet to a position at right angles to such sheet so as to provide two projecting elements for contact of the support with the surface of the tread to which the pedal pad is to be applied.

At approximately the transverse center line of the support 12 a similarly cut-out member 20 is formed, such member projecting from the surface of the support near the upper edge thereof. A similar member 21 is formed in line with the member 20 and projecting from the plane of the support near the lower edge thereof. The members 20 and 21 are provided with apertures 22 and 23, respectively, through which extends a threaded adjusting bolt 24, having at the end thereof extending through the member 21 an enlarged head 25. At its other end, the bolt 24 is provided with a head 26 abutting against the projection 20, the free end of the head being provided with a slot 27 adapted to receive the end of a screw driver or similar implement for effecting rotation of the bolt 24.

Threaded upon the bolt 24 by means of a tongue 28 is a jaw carrying member 29 having a projection 30 at the free end thereof bent upwardly to form a jaw. The jaw carrying member 29 and its integral jaw 30 is thus mounted by means of tongue 28 for movement transversely of the support 12 upon rotation of the adjusting bolt by a screw driver or similar implement.

The support 12 is provided upon its side opposite to that from which extends the jaw 30 with a pair of apertures through which extend rivets 31 and 32. Pivotally mounted upon the rivets 31 and 32 are jaw members 33 and 34 respectively, such jaw members having their pivotal members 35 and 36, respectively, secured upon the support 12 by having the rivets pass therethrough.

In the application of my novel pedal pad to the tread of a clutch or brake mechanism, the jaw carrying member 29 is moved along the bolt 24 by rotating the latter until the jaw 30 is sufficiently spaced from the pivoted jaws 33 and 34 to permit the positioning of the support 12 upon the tread so as to have the projections 18 and 19 in contact with the surface of said tread as illustrated in Fig. 5. The screw driver or similar implement is thereafter used to effect rotation of the bolt 24 in the opposite direction to bring the jaw 30 into engagement with the edge of the tread. At the same time the opposite edge of the tread will be engaged by the jaw members 33 and 34, the pivotal mounting of such jaw members permitting the securement of an absolutely firm clamping of the pedal pad upon the tread as such pivoted jaws 33 and 34 will assume a position in which their surfaces tangentially grip the edges of the tread, in case the tread is oval; or, in case the tread is rectangular in configuration, the jaws will turn about their pivots so as to effect a firm contact between their inner surfaces and the edge of the tread.

As will be noted from an inspection of Figs. 1 and 4, projections 18 and 19 are effective to retain the pedal pad sufficiently removed from the surface of the tread to permit a free movement of the jaw carrying member 29 upon rotation of the bolt 24 without frictional contact of such jaw carrying member with the surface of the tread.

My novel pedal pad structure, as hereinabove described, is extremely simple in construction and is characterized by a marked economy in cost of manufacture in view of the fact that the resilient or cushioning pad portion thereof may be moulded independently of the supporting structure instead of being moulded directly with and upon such supporting structure as in the devices of the prior art.

As will be noted from the above description, my novel pedal pad structure is also characterized by great facility of application thereof to a pedal tread of any configuration. The securement of the pedal pad structure to such tread is obtained by the simple operation involving the positive movement of only one of the three clamping jaws, the other two clamping jaws being capable of assuming automatically their positions in which they firmly secure the pedal pad structure to the tread. An important feature of my invention, therefore, resides in the pivotal mounting of the two clamping jaws on one side of the pedal pad support.

While I have described a specific embodiment of my invention, it is obvious that various modifications therein, particularly in the arrangement and construction of the several parts thereof may be made without departing from my invention.

I claim:

1. A pedal pad comprising in combination a support, a facing of a resilient material, a clamping jaw movable transversely of the support, and a pair of clamping jaws pivotally mounted upon said support for movement in a plane parallel to the plane of said support.

2. A pedal pad comprising in combination a support, a facing of a resilient material thereon, a member movable transversely of the support and carrying a clamping jaw, and a pair of clamping members pivotally secured to said support for pivotal movement in a plane parallel to the plane of said support, said pair of clamping members being secured near the edge thereof opposite that near which extends such first mentioned clamping jaw.

3. A pedal pad comprising in combination a support, a facing of a resilient material thereon, a member movable transversely of the support and carrying a clamping jaw, an operator extending transversely of the support for causing movement of said clamping jaw carrying member transversely of the support, and a pair of clamping members pivotally secured to said support near the edge thereof opposite that near which extends such first mentioned clamping jaw.

4. A pedal pad comprising a resilient cushioning pad having a body portion provided with an internal peripheral channel, a support for said resilient cushioning pad, the peripheral edges of which support are positioned within said interior peripheral channel, and means on said support for bringing the same into clamping engagement with a pedal tread, said means comprising a clamping jaw movable transversely of the support and a pair of clamping jaws pivotally mounted upon said support for movement in a plane parallel to the plane of said support.

5. A pedal pad comprising in combination a support, a separately formed facing of a resilient material removably secured thereon, a clamping jaw member movable transversely of the support, and a pair of clamping jaws pivotally mounted upon said support for movement in a plane parallel to the plane of said support.

6. A pedal pad comprising in combination a support, a facing of a resilient material thereon, a member movable transversely of the support and carrying a clamping jaw, an operator extending transversely of the support for causing movement of said clamping jaw carrying member transversely of the support, said operator comprising a threaded bolt supported at its two ends upon a pair of projections cut from the face of said support and bent at right angles thereto, and a pair of clamping members pivotally secured to the said support near the edge thereof opposite that near which extends such first mentioned clamping jaw.

7. A pedal pad as claimed in claim 2 in which the support comprises a sheet of metal having portions cut from the face thereof and bent to a position at right angles to such face so as to provide projections for contact with the surface of the tread to which the pedal pad is to be applied, thereby spacing the face of the support from said tread and providing ample room for movement of the clamping jaw carrying member between said support and tread.

HERBERT H. LAMPERT.